June 20, 1939. A. P. DE SEVERSKY Re. 21,120
LANDING GEAR FOR AIRCRAFT
Original Filed April 25, 1928 3 Sheets-Sheet 1
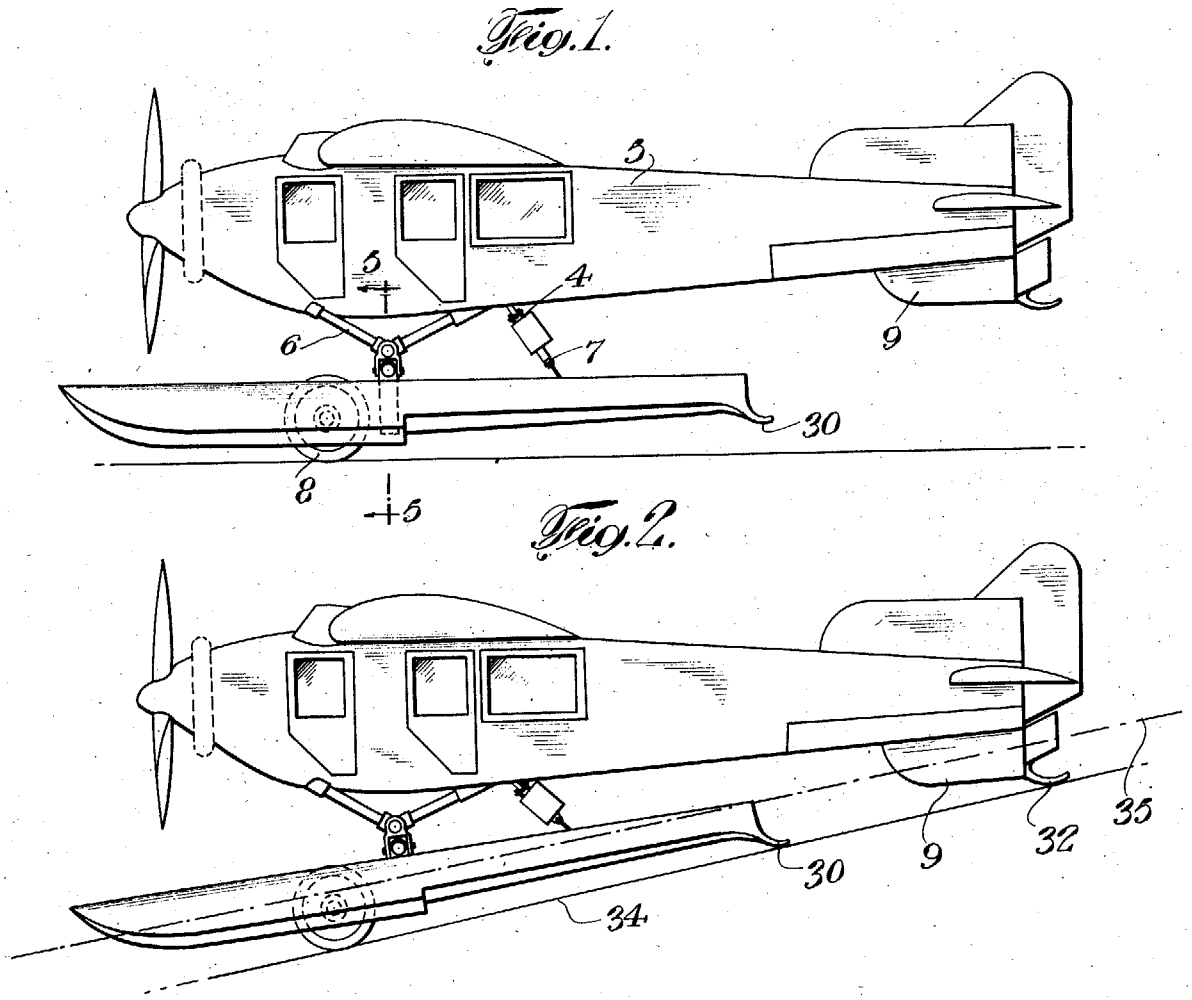
Inventor
ALEXANDER P. DE SEVERSKY
By Attorney
Maurice B. Landen June 20, 1939. A. P. DE SEVERSKY Re. 21,120

LANDING GEAR FOR AIRCRAFT

Original Filed April 25, 1928 3 Sheets-Sheet 2

Inventor
ALEXANDER P. DE SEVERSKY

By Attorney
Maurice B. Landers

June 20, 1939. A. P. DE SEVERSKY Re. 21,120
LANDING GEAR FOR AIRCRAFT
Original Filed April 25, 1928 3 Sheets-Sheet 3
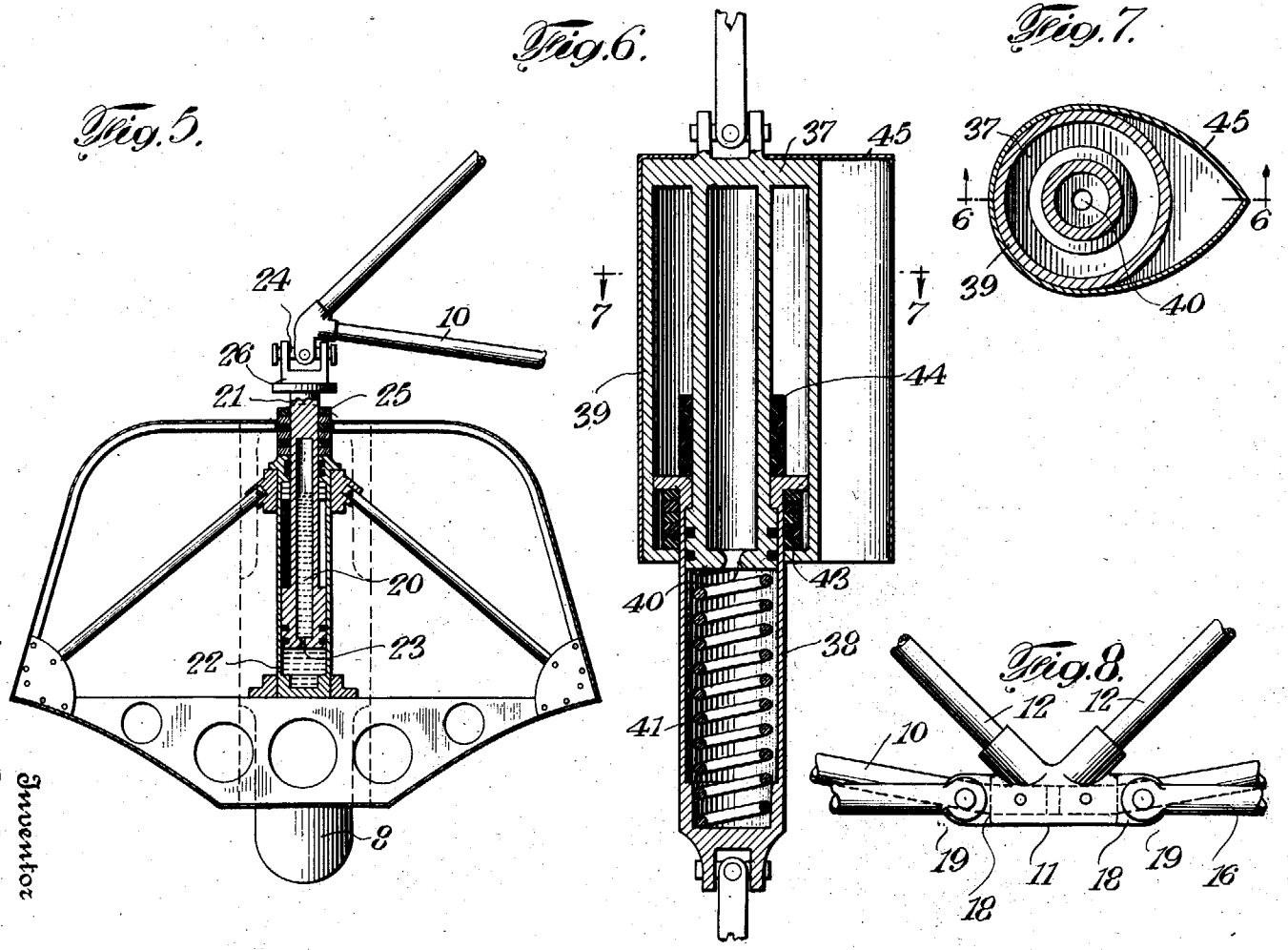
Inventor
ALEXANDER P. DE SEVERSKY
By Attorney
Maurice B. Landers Reissued June 20, 1939

Re. 21,120

UNITED STATES PATENT OFFICE 21,120

LANDING GEAR FOR AIRCRAFT

Alexander P. de Seversky, New York, N. Y., assignor, by mesne assignments, to Seversky Aircraft Corporation, a corporation of Delaware Original No. 2,007,752, dated July 9, 1935, Serial No. 272,627, April 25, 1928. Renewed August 10, 1932. Application for reissue July 9, 1937, Serial No. 152,865

9 Claims. (Cl. 244—101)

The present invention relates to aircraft and has for an object to provide an improved amphibian landing gear.

The invention provides a landing gear having in the preferred embodiment, a plurality of pontoons each connected resiliently to the craft and each carrying a wheel arranged to engage the ground to take the load when landing on the ground. The arrangement of the preferred embodiment to be herein more particularly described is such that the pontoons for landing on the water or the wheels for landing on the ground are immediately available for landing or taking off without any manual adjustment of either.

The nature and objects of the invention will be better understood from a description of a selective embodiment for the purpose of which description reference should be had to the accompanying drawings forming a part hereof and in which—

Figure 3:
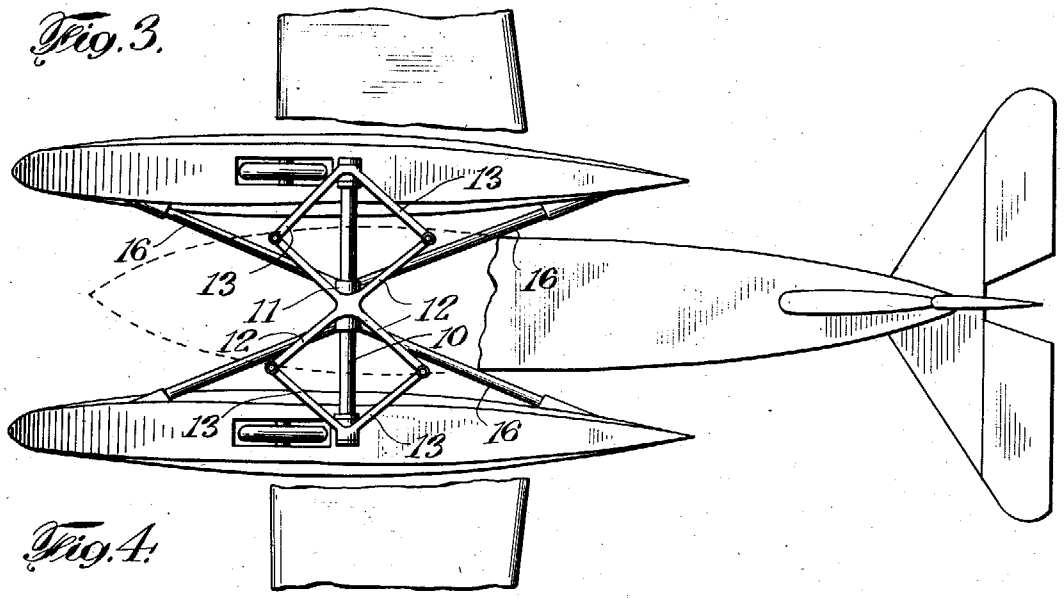
Figure 4:
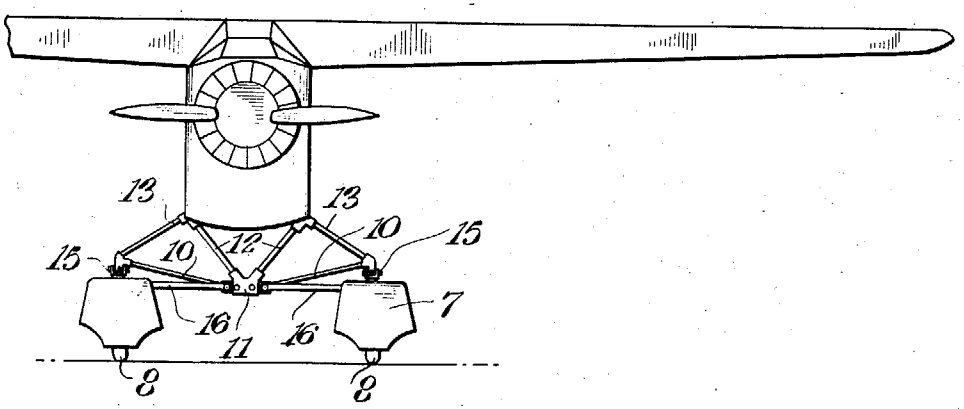

Figure 1 is a view in side elevation of an aircraft embodying the invention,

Figure 2 is a similar view but showing the parts in position assumed when landing, Figure 3 is a top plan view of the same, Figure 4 is a view in front elevation, Figure 5 is a sectional detail view taken on the line 5—5 of Fig. 1, Figure 6 is a sectional view taken on the line 6—6 of Fig. 7, Figure 7 is a horizontal sectional view taken on the line 7—7 of Fig. 6, and Figure 8 is a view in front elevation of the center portion of the under frame of the landing gear.

Referring to the embodiment shown for the purpose of illustrating the principles of the invention, an aircraft fuselage 5 carries a landing gear having an underframe 6 supporting a pair of pontoons 7 with wheels 8, a third pontoon, or float, 9 being carried by the rear end of the fuselage to support the tail of the craft. The framework 6 comprises substantially horizontal axle members 10, to the outer ends of which the pontoons 7 are pivoted for movement in a longitudinal vertical plane. Suitable extensible members 4 are arranged to normally hold the pontoons horizontally during flight but to yield readily upon landing. The axle members 10 are connected at their inner ends to a coupling member 11 securely held in fixed position by four diagonal braces 12, secured at their upper ends to the fuselage this structure constituting the cabane. The outer ends of these axle members are held rigidly in position by braces 13 also connected to the fuselage. It is desirable that the pontoons be permitted a rocking movement about the axle members to which they are pivotally supported, while at the same time it is important to prevent lateral turning thereof. In the construction shown, the pontoons are pivoted to the underframe at 15 for rocking movement in a longitudinal plane but lateral movement about a vertical axis or lateral movement about a longitudinal horizontal axis is prevented by means of braces 16 fitted rigidly to the pontoons toward the forward and rear ends thereof and the coupling members 11. These braces 16 are so designed that stresses tending to turn the pontoons about a vertical axis will be resisted by said braces acting in tension and compression, but stresses tending to rotate the pontoons about a horizontal axis, which stresses would be of less intensity, are resisted by the same braces acting more or less as cantilever beams rigidly fixed at their outer ends to the pontoons and pivotally secured at their inner ends to the coupling 11 of the underframe. The connection between the braces 16, and the coupling 11 may include at each side a sleeve 18 having trunnions 19 engaged by the braces.

As shown, each pontoon is connected to the underframe by means including a shock absorber mechanism housed within the pontoon and arranged to permit a limited resilience in landing. In the structure shown a dashpot 20 serves as a cushioning device between the underframe and the pontoon. A central plunger 21 is pivoted to the underframe and operates in a cylinder 22 forming a rigid part of the pontoon. The plunger 21 is hollow and has a restricted opening 23 in the lower end thereof to permit restricted flow of oil from the cylinder 22 into the hollow of the plunger thus to yieldably support the load of the plane when landing. The connection between the plunger 21 and the underframe provides for a limited relative lateral movement to avoid binding, as indicated at 24. A number of rubber buffer rings 25 are provided around the plunger 21 in position to be engaged by a collar 26 on said plunger as the plunger approaches its lowermost position in the cylinder 22. During flight the pontoon will move by its own weight to lowermost position relative to the plunger 21 thus automatically taking the desired position for landing.

In order that the landing gear may operate effectively when landing on or taking off from the ground the pontoons are provided with the wheels 8 rotatably mounted in the pontoons a relatively short distance in front of the point of pivotal support of the pontoons on the underframe. During landing on the ground, the weight of the pontoons is distributed between these wheels 8 and skids 30 formed at the rear of the pontoons. When the tail of the craft is down, its weight is supported on a skid 32 which conveniently may project from the pontoon 9 on the tail of the fuselage.

By the arrangement described, it is possible to land alternatively upon the water or on the ground without making any adjustment of the landing gear and yet an effective three point landing can be made in either event. The position of the pontoon and tail skid 32 when making a three point landing is indicated in Fig. 2 where the ground level is indicated by the line 34 and the water line by a line 35. The pontoon is self stabilizing.

Figs. 6 and 7 show another form of shock absorbing device which may be connected between the underframe and the pontoon in any suitable way. This device comprises a plunger member 37 operating within a piston 38 and having an exterior casing 39 arranged to enclose the cylinder 38. The lower end of the plunger is provided with a restricted aperture 40 in order that the air or oil within the cylinder and plunger may provide a cushioning effect. A spring 41 in the cylinder 38 engages the end of the plunger 37 and resists inward movement thereof. Shock absorbing buffer rings 43 of rubber or other suitable material are provided to reduce the shock at the limit of the downward movement of the pontoon and similar buffer rings 44 similarly resist the shock at the end of the upward movement of the pontoon during landing. If the device projects above the pontoon a streamline shell 45 is preferably provided.

The foregoing description is illustrative merely and is not intended as defining the limits of the invention.

I claim:—

1. An aircraft comprising, in combination, a fuselage, a support dependent therefrom, a pontoon pivoted to said support, a wheel rotatably mounted in said pontoon forward of the pivotal support thereof, a skid at the rear end of said pontoon arranged to cooperate with said wheel to support said pontoon on the ground, an independent skid at the rear of said fuselage rearwardly of said pontoon, substantially as described.

2. An aircraft, as defined in claim 1, wherein a shock absorbing mechanism is arranged between the pontoon and the support thereof, substantially as described.

3. An aircraft, as defined in claim 1, having a pontoon at the rear end of the fuselage, substantially as described.

4. An aircraft comprising a fuselage, a pair of pontoons and a tail float connected to the fuselage, said pontoons being provided with wheels and said pontoons and float being provided with skids at the rear end of each, whereby a three point landing may be made upon the ground or in the water, substantially as described.

5. A shock absorber for aircraft landing gear comprising a member providing a central plunger and an outer cylinder casing, a movable cylinder enclosing said plunger and having a head engaging said cylinder casing and rubber buffer rings between said head and opposite ends of said member for resisting shocks at the extreme limit of movement in both directions, substantially as described.

6. A shock absorber for aircraft landing gear comprising a plunger, a movable cylinder enclosing said plunger, said plunger having a head movable for a considerable distance in said cylinder to resiliently resist shocks and rubber buffer rings on both sides of said head for resisting shocks at the extreme limit of movement in both directions, substantially as described.

7. An aircraft landing gear comprising an underframe including a cabane, a pair of pontoons at opposite sides of said cabane, a shock absorber connecting each pontoon to the cabane and forming the principal support between the frame and the pontoon and by which the pontoon is supported for vertical and rocking movement in a longitudinal vertical plane, braces extending diagonally outward from the cabane fore and aft to the pontoons and rigidly secured thereto, said braces preventing movement of the pontoon from its longitudinal vertical plane while permitting rocking and vertical movement in said plane.

8. An aircraft comprising a fuselage, a supporting frame depending therefrom and having a central member 11 and transverse members 10 extending laterally therefrom, a pair of pontoons, shock absorbers between the outer ends of the transverse members and the pontoons by which the pontoons are supported for vertical and pivotal movement in longitudinal vertical planes, and braces 16 extending from the center member 11 diagonally outward and respectively fore and aft, said braces being rigidly connected to the pontoons and inhibiting movement thereof out of the longitudinal vertical plane.

9. An aircraft comprising, in combination, a fuselage, a rigid support dependent therefrom and extending below the fuselage, a pontoon pivoted to said support, a wheel rotatably mounted in said pontoon forward of the pivotal support thereof, a landing surface engaging means at the rear end of said pontoon arranged to cooperate with said wheel to support said pontoon on the landing surface, and independent, land and water landing surface engaging means at the rear of said fuselage.

ALEXANDER P. DE SEVERSKY.